(12) United States Patent
Hayashi et al.

(10) Patent No.: US 7,398,922 B2
(45) Date of Patent: Jul. 15, 2008

(54) POS TERMINAL APPARATUS

(75) Inventors: Hiroaki Hayashi, Nagano (JP); Yuichi Tsuchiya, Nagano (JP); Tomohiro Kodama, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 189 days.

(21) Appl. No.: 11/170,084

(22) Filed: Jun. 30, 2005

(65) Prior Publication Data

US 2006/0065722 A1    Mar. 30, 2006

(30) Foreign Application Priority Data

Sep. 28, 2004 (JP) .......................... P2004-281543
May 2, 2005 (JP) .......................... P2005-133882

(51) Int. Cl.
 *G06K 15/00* (2006.01)
(52) U.S. Cl. ..................................... 235/383; 235/381
(58) Field of Classification Search ................. 235/383, 235/381; 399/8, 10
See application file for complete search history.

(56) References Cited

U.S. PATENT DOCUMENTS 5,995,771 A * 11/1999 Miyawaki .................. 399/8
6,366,741 B1 * 4/2002 Fukushima ................. 399/8
6,944,408 B2 * 9/2005 Holzner .................... 399/24
7,117,239 B1 * 10/2006 Hansen ..................... 709/200

FOREIGN PATENT DOCUMENTS

| JP | 7-175613 | 7/1995 |
| JP | 2002-318703 | 10/2002 |
| JP | 2003-30009 | 1/2003 |

* cited by examiner

*Primary Examiner*—Ahshik Kim
(74) *Attorney, Agent, or Firm*—Nixon & Vanderhye P.C.

(57) ABSTRACT

A POS terminal apparatus is adapted to be connected to an external device. With an application running in the POS terminal apparatus, a device manager determines whether the external device is capable of counting a first value indicating a usage amount of the external device, and if so, the device manager acquires the first value from the external device in response to a first command from the application. A counter retains a second value indicating the usage amount of the external device and notifies the second value to the application in response to a second command from the application. If it is determined that the external device is not capable of counting the first value, the counter virtually counts the second value in accordance with a third command sent from the application to the external device. An updater updates the second value with a third value which is obtained by a fourth command from the application. The first value is retained even when the second value is updated with the third value.

9 Claims, 5 Drawing Sheets

POS TERMINAL APPARATUS

BACKGROUND OF THE INVENTION

The present invention relates to a POS system including a POS (point-of-sale) terminal apparatus and a device connected thereto, and relates more particularly to technology for determining device usage.

JAVA POS is an application programming interfacing for building point-of-sale (POS) systems using JAVA (registered trademark). JAVA POS also has a function for using device statistics, that is, information relating to usage of devices connected to a POS terminal. The JAVA POS standard enables an application running on a POS terminal to acquire and use these device statistics for example as device usage information. This usage information is information indicating usage of particular device functions, and in the case of a printer is information relating to the number of lines printed or the number of characters printed, for example.

Depending on the model or type of device, some devices have an internal maintenance counter for counting usage of particular functions. A device having such an internal counter can acquire device statistics about device operation by reading these counters. There are also devices that do not have such an internal counter.

Some applications that run on a POS terminal can preferably use such device statistics regardless of whether the connected device has a maintenance counter.

Furthermore, the maintenance counters provided in such devices are typically used for maintenance of that device. A POS terminal connected to the device therefore preferably does not rewrite the maintenance counters.

SUMMARY OF THE INVENTION

It is therefore an object of the present invention to enable using these device statistics in a POS system.

It is also an object of the invention to use readings from maintenance counters in the individual devices as device statistics without changing the value stored by the particular counter.

In order to achieve the above objects, according to the invention, there is provided a POS (point-of-sale) terminal apparatus adapted to be connected to an external device, comprising:

an application running in the POS terminal apparatus;

a device manager capable of communicating with the external device, the device manager determining whether the external device is capable of counting a first value indicating a usage amount of the external device, and acquiring the first value from the external device in response to a first command from the application, when it is determined that the external device is capable of counting the first value;

a counter retaining a second value indicating the usage amount of the external device and notifying the second value to the application in response to a second command from the application, the counter virtually counts the second value in accordance with a third command sent from the application to the external device, when it is determined that the external device is not capable of counting the first value; and an updater updating the second value with a third value which is obtained by a fourth command from the application with reference to the first value acquired by the device manager, wherein the first value is retained when the second value is updated with the third value.

Preferably, the updater subtracts a fourth value from the second value, and the fourth value is obtained by subtracting the first value from the third value.

Preferably, the POS terminal apparatus further comprises a storage component, wherein the device manager acquires the first value when a predetermined event is occurred and stores the acquired first value in the storage component.

Preferably, the POS terminal apparatus further comprises a storage component, wherein the device manager stores the second value in the storage component when a predetermined event is occurred.

The POS terminal apparatus further comprises a predictor predicting a function count of the external device based on a command from the application. The apparatus additionally comprises a cumulative counter accumulating and storing the predicted function count.

According to the invention, there is also provided a management method of a usage amount of an external device connected to a POS (point-of-sale) terminal apparatus, comprising:

running an application in the POS terminal apparatus;

determining whether the external device is capable of counting a first value indicating a usage amount of the external device;

acquiring the first value from the external device in response to a first command from the application, when it is determined that the external device is capable of counting the first value;

retaining a second value indicating the usage amount of the external device;

notifying the second value to the application in response to a second command from the application;

counting the second value in accordance with a third command sent from the application to the external device, when it is determined that the external device is not capable of counting the first value; and updating the second value with a third value which is obtained by a fourth command from the application with reference to the acquired first value, wherein the first value is retained when the second value is updated with the third value.

Preferably, the second value is updated by subtracting a fourth value from the second value, and the fourth value is obtained by subtracting the first value from the third value.

Preferably, the first value is acquired when a predetermined event is occurred and the acquired first value is stored in a storage component.

Preferably, the second value is stored in the storage component when a predetermined event is occurred.

According to the invention, there is also provided a POS (point-of-sale) terminal apparatus adapted to be connected to an external device, comprising:

a general purpose computer including a processor and a memory, the general purpose computer running an application;

a device manager capable of communicating with the external device, the device manager determining whether the external device is capable of counting a first value indicating a usage amount of the external device, and acquiring the first value from the external device in response to a first command from the application, when it is determined that the external device is capable of counting the first value;

a counter retaining a second value indicating the usage amount of the external device and notifying the second value to the application in response to a second command from the application, wherein the counter virtually counting the second value in accordance with a third command sent from the application to the external device, when it is determined that the external device is not capable of counting the first value; and an updater updating the second value with a third value which is obtained by a fourth command from the application with reference to the first value acquired by the device manager, wherein the first value is retained when the second value is updated with the third value.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF THE EMBODIMENTS

Embodiments of the present invention will be described below in detail with reference to the accompanying drawings.

Figure 1:
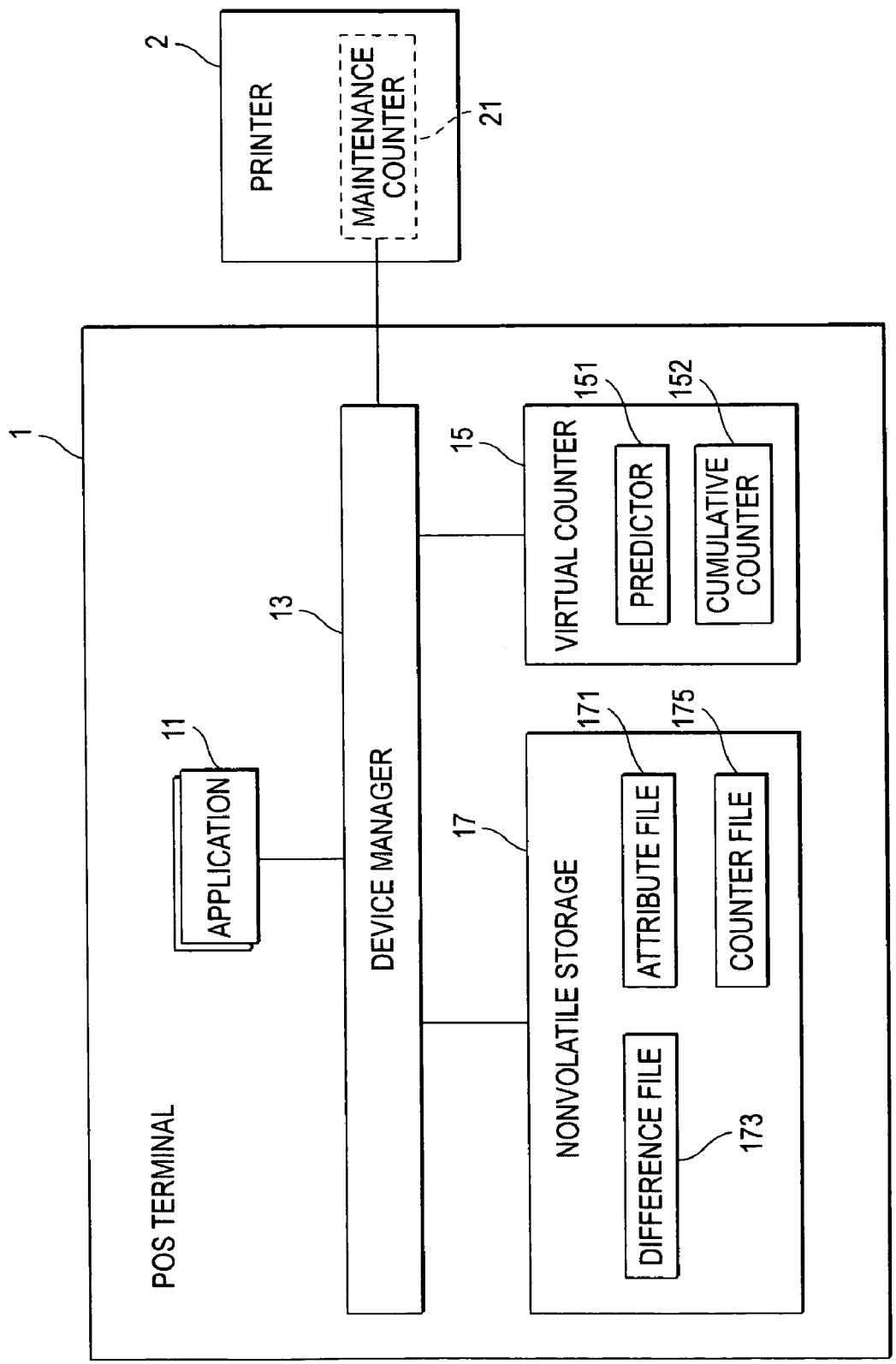
FIG. 1 is a block diagram of a POS system according to one embodiment of the present invention.

As shown in FIG. 1, a POS system according to one embodiment of the invention comprises a POS terminal 1 and a printer 2 as an example of a device connected to and used with the POS terminal 1.

The present invention is described below using a printer 2 by way of example as a device, but the invention shall not be so limited. More particularly, the present invention can be used with a variety of peripheral devices connectable to the POS terminal 1, including a magnetic ink character reader (MICR), a scanner, and an optical character reader (OCR). In addition, one or a plurality of printers 2 or other devices can be connected to the POS terminal 1 shown in FIG. 1.

The device statistics used by a POS terminal 1 in this embodiment denote for each of one or a plurality of functions of a connected device how much a particular function is used. A POS terminal 1 in this embodiment is thus described by way of example as determining the number of lines printed by the printer 2 as a device statistic.

Multiple different printers 2 can be connected to the POS terminal 1. Depending on the printer type, some printers have an internal maintenance counter and some do not have a maintenance counter. A maintenance counter 21 as used herein is a counter that counts, accumulates, and stores some quantity indicating how much a particular function is used whenever the printer 2 uses a particular function. Use of some printer functions is denoted by, for example, the number of characters printed, the number of lines printed, the amount of ink consumed, the length of paper that is transported and the number of times the paper cutter operates when printing is performed with respect to a rolled sheet, and the number of sheets printed when printing is performed with respect to cut sheets.

For example, if the printer 2 having a maintenance counter performs printing with respect to the rolled sheet discharges the printed rolled sheet and then drives a paper cutter to cut the paper in response to a print command from the POS terminal 1, the maintenance counter 21 counts the number of lines actually printed or the actual number of printed characters, adds these counts to the previous cumulative printed line count and cumulative printed character count, and adds one to the cumulative paper cut count.

The POS terminal 1 is a general purpose computer having a processor and a memory, and the various elements and functions of the POS terminal 1 described below are achieved by causing the POS terminal 1 to execute steps in a computer program.

The POS terminal 1 has one or more applications 11 for executing particular processes, a device manager 13 for managing the devices connected to the POS terminal 1, a virtual counter 15 for virtually counting how much a particular device function is used, and a nonvolatile storage 17.

The application 11 sends commands requesting different processes to the device manager 13. Commands sent to the device manager 13 might request printing on the printer 2, referencing a counter for one of the printer 2 usage parameters, or updating or resetting a particular counter.

The device manager 13 executes various processes involving the connected devices. When the device manager 13 receives a command from the application 11, for example, the device manager 13 runs the processes requested by the command. If the command requests printer 2 processes, for example, the device manager 13 generates commands to control the printer 2 accordingly and sends these commands to the printer 2, thus causing the printer 2 to execute particular processes. If a command for reading one of the counters indicating printer usage is received, the device manager 13 runs the processes indicated by the command type. This process is described in further detail below.

The device manager 13 also acquires from the printer 2 information such as the model ID denoting the type of printer 2. In addition, if a particular escape event occurs, the device manager 13 saves the cumulative counts for each of the functions monitored by the virtual counter 15, the cumulative counts of the function counters kept by the maintenance counter 21, and difference information from a difference file 173 to a counter file 175 as further described below. Conversely, the device manager 13 also restores the virtual counter 15 by reading the counter information from the counter file 175.

The virtual counter 15 virtually counts the usage of specific functions of the printer 2. The virtual counter 15 has a predictor 151 for predicting the count of a particular function, and a cumulative counter 152 for accumulating and storing the cumulative predictive counts for each function. For example, if the device manager 13 sends to the printer 2 a command requesting the printer 2 to execute a particular function, the predictor 151 interprets the command and predicts the usage value for one or a plurality of specific functions used by the printer 2. Similar to the maintenance counter 21, the predictor 151 predicts and counts the printed line count, paper cutting operations, and other functions. The resulting predicted counts are then added to the cumulative counter 152.

The virtual counter 15 also has a reset function for clearing the cumulative counter 152 to zero, and an update function for setting the cumulative counter 152 to a particular value, in response to a command from the application 11.

The virtual counter 15 may be in operation only when the connected printer 2 does not have an internal maintenance counter.

The predictor 151 can predict the usage of each function according to the type of command sent to the printer 2 as described below.

(1) If the command is a text printing command, the predictor 151 predicts the number of characters and lines printed by counting the number of characters and line returns specified by the parameters of the print command.

(2) If the print command is a command for printing an image such as a barcode, the predictor 151 counts the number of dots printed by the printer 2 to print the image data contained in the print command, and converts this dot count to the equivalent number of characters in a specified font. For example, the number of dots per character used for this conversion may be the number of dots in the font size most frequently used by the printer 21A (such as 12 dots wide by 24 dots tall), or the average number of dots in one character.

Image data print commands also contain image size and scaling information. The predictor 151 may thus use this information to determine the height of the image when printed by the printer 2, and predict the number of lines printed based on the calculated image height and the predetermined height (line feed distance) of one line.

(3) The predictor 151 also detects escape sequence control commands to predict printer usage. The predictor 151 may, for example, count the number of times the paper is cut based on the number of times a paper cut command is sent, and count the number of paper cut escape sequences contained in the print command.

The predictor 151 also counts, for example, the number of times a barcode is printed, a slip is inserted, and the printing side of the paper is changed by detecting and counting the number of the corresponding commands normally executed by the printer 2. The number of home position errors can also be represented by a mechanical error count.

The nonvolatile storage 17 stores an attribute file 171 for storing attribute data for the plural devices connectable to the POS terminal 1, the difference file 173 for storing information about the difference between the predicted counts and the actual counts kept by the maintenance counter 21 of the printer 2, and the counter file 175 for storing counter information. The attribute data stored in the attribute file 171 includes for each printer or other device ID information indicating whether the device identified by the device ID has a maintenance counter. The counter file 175 stores counter values acquired from the cumulative counter 152 in the virtual counter 15 or the maintenance counter 21, for example.

Operation of a POS system thus comprised will be described with reference to the flow charts in FIGS. 2 to 5.

Figure 2:
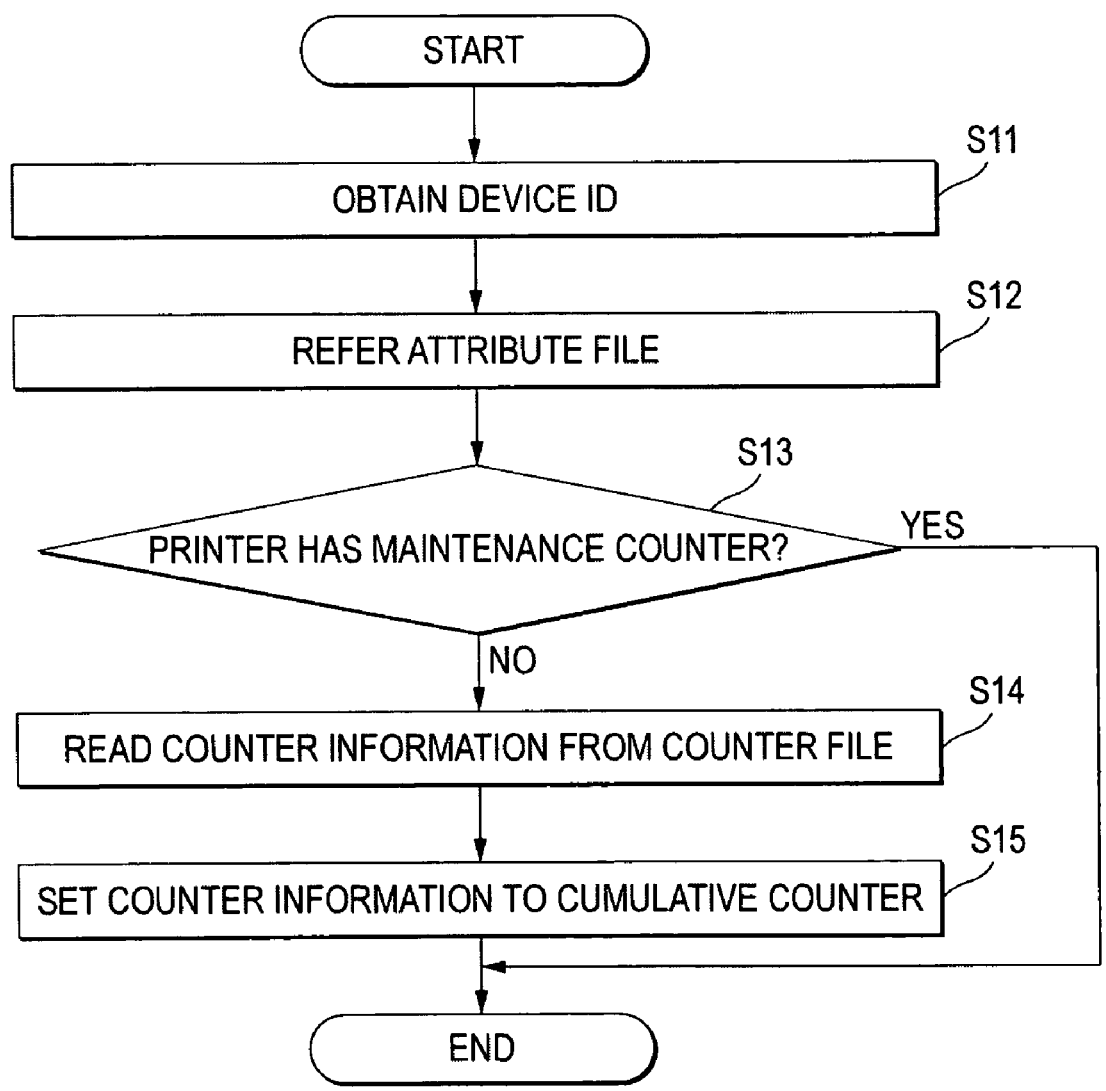
FIG. 2 is a flow chart of a POS terminal initialization processing executed in the POS system of FIG. 1.
Figure 3:
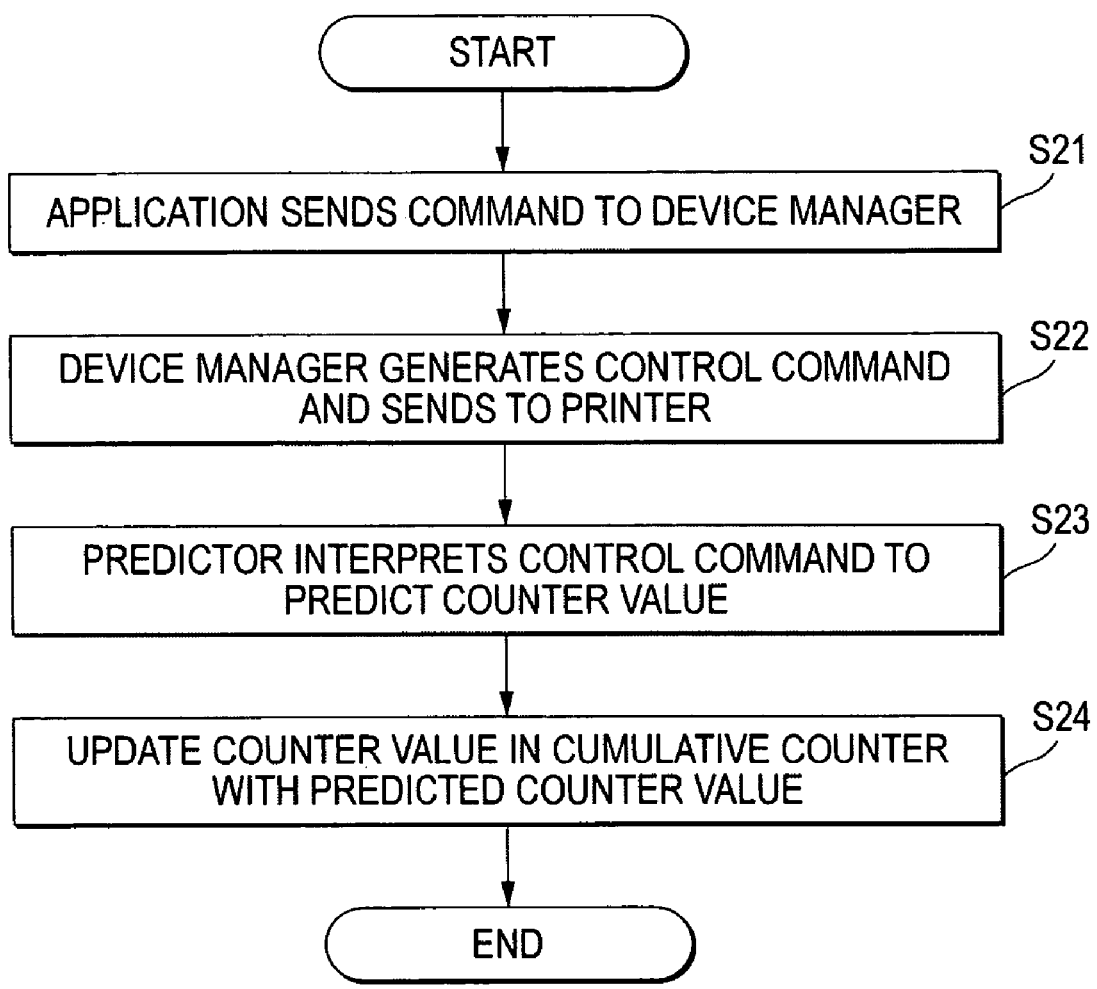
FIG. 3 is a flow chart of a process run by a virtual counter in the POS system of FIG. 1.

The initialization processing of the POS terminal 1 runs when the POS terminal 1 power turns on. As shown in FIG. 2, this initialization processing starts with the device manager 13 acquiring the device ID of the printer 2 from the printer 2 (S11). The device manager 13 then refers to the attribute file 171 storing the attribute data for the model of printer 2 based on the acquired device ID (S12). The device manager 13 then determines from this attribute data if the printer 2 is a model having a maintenance counter 21 (S13).

If the type of printer 2 connected to the POS terminal 1 is already known, step S13 may be skipped.

If the device manager 13 determines in step S13 that the printer 2 is a model that does not have a maintenance counter 21 (No in S13), the device manager 13 reads the counter information from the counter file 175(S14). As further described below, the values kept by the cumulative counter 152 are stored to the counter file 175 when the POS terminal 1 turns off. The counter information read from the counter file 175 is thus set to the cumulative counter 152 in the virtual counter 15 to restore the counters to the same state as when the power of the POS terminal was turned off.

If the printer 2 is determined to be a model having a maintenance counter 21 in step S13 (YES in S13), steps S14 and S15 can be skipped.

Next, the process run by the POS terminal 1 when a printer 2 that does not have a maintenance counter 21 is connected will be described.

When the printer 2 operates according to commands from the application 11, the virtual counter 15 virtually counts the parameter indicating how much a particular function of the printer 2 is used. This process is described with reference to the flow chart in FIG. 3.

The application 11 sends a specific command to the device manager 13 when sending a particular processing request to the printer 2 (S21). The device manager 13 then sends a control command generated based on this application command to the printer 2, thus causing the printer 2 to operate according to the command (S22). The virtual counter 15 also acquires this command from the device manager 13. The predictor 151 then interprets the command, and predicts the functions used by the printer 2 to execute the command and the counter values indicating the predicted usage of those functions (S23). These predicted values are then added to the corresponding counts in the cumulative counter 152, thus updating the cumulative counts (S24).

When a particular escape event occurs, the device manager 13 detects the event and saves the readings from the cumulative counter 152 in the virtual counter 15 to the counter file 175. These escape events are specific predetermined events such as the POS terminal 1 power turning off, receiving a command from the application 11, and turning the printer 2 on/off. By thus saving the counter readings to nonvolatile storage 17, the counts predicted by the virtual counter 15 will not be lost if the POS terminal 1 suddenly shuts down, for example.

In order to use the cumulative counter readings, the application 11 can read the counters or perform specific operations on the counters, such as resetting or setting a counter to a specific value. The process run by the device manager 13 when a command to read a counter, for example, is received from the application 11 is described below.

When the device manager 13 receives a read counter command from the application 11, for example, the device manager 13 reads the requested count from the cumulative counter 152. This command may request all cumulative counter readings in the cumulative counter 152 or the readings for only specific function counters. The device manager 13 then gets and returns the values for all requested counters or only the values for the specifically requested counters to the application 11 as instructed by the application 11.

The application 11 can thus acquire information denoting how much specific functions of the printer 2 were used even if the connected printer 2 does not have an internal maintenance counter 21.

When the device manager 13 receives an update counter command from the application 11, the device manager 13 instructs the virtual counter 15 to update the cumulative counters to specific values. The virtual counter 15 then updates the specified counters in the cumulative counter 152 to the specified values.

When a counter reset command is received from the application 11, the device manager 13 similarly causes the virtual counter 15 to reset. The virtual counter 15 thus clears the cumulative counter 152 to zero.

The counters can be updated or reset using a batch processing in which all counters are updated or reset, or individually for updating or resetting counters for specified individual functions. As a result, the application 11 can freely set the cumulative counter 152 as desired.

The processes executed by the POS terminal 1 when the connected printer 2 has a maintenance counter 21 will be described. The same processes run when the printer does not have a maintenance counter 21 can be run when the printer does have a maintenance counter 21, and the following processes thus relate to using the maintenance counter 21.

The readings of the maintenance counter 21 can also be saved to the counter file 175 when the printer 2 has a maintenance counter 21. More specifically, when a specific escape event is detected, the device manager 13 acquires the cumulative counters stored by the maintenance counter 21 and saves the readings to the counter file 175. The device manager 13 may also save the difference information stored in the difference file 173 to the counter file 175.

Escape events applicable in this situation include receiving a command from the application 11, the printer 2 turning on/off, and the printer 2 going on line. Note that the POS terminal 1 power turning off can also be handled as an escape event.

Figure 4:
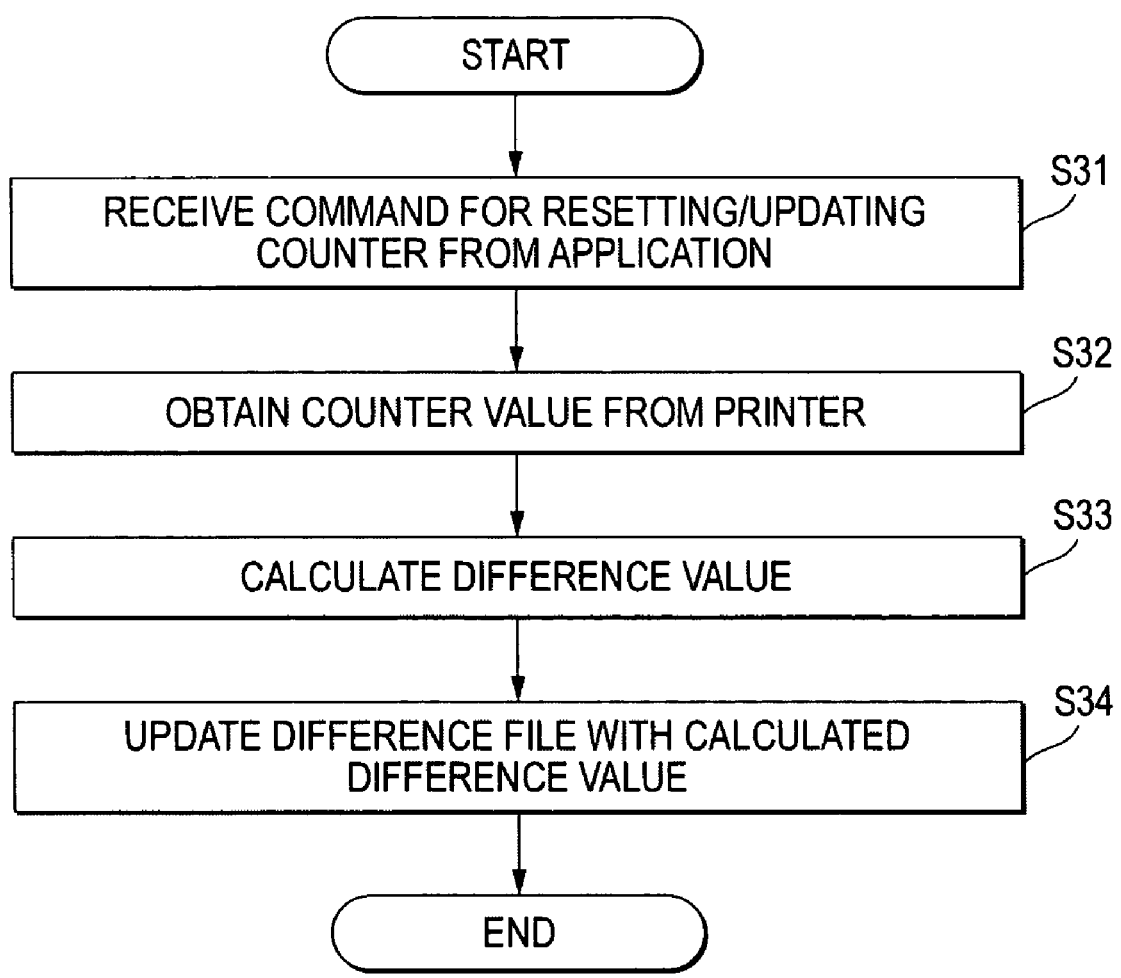
FIG. 4 is a flow chart of a process for updating or resetting a counter in the POS system of FIG. 1.
Figure 5:
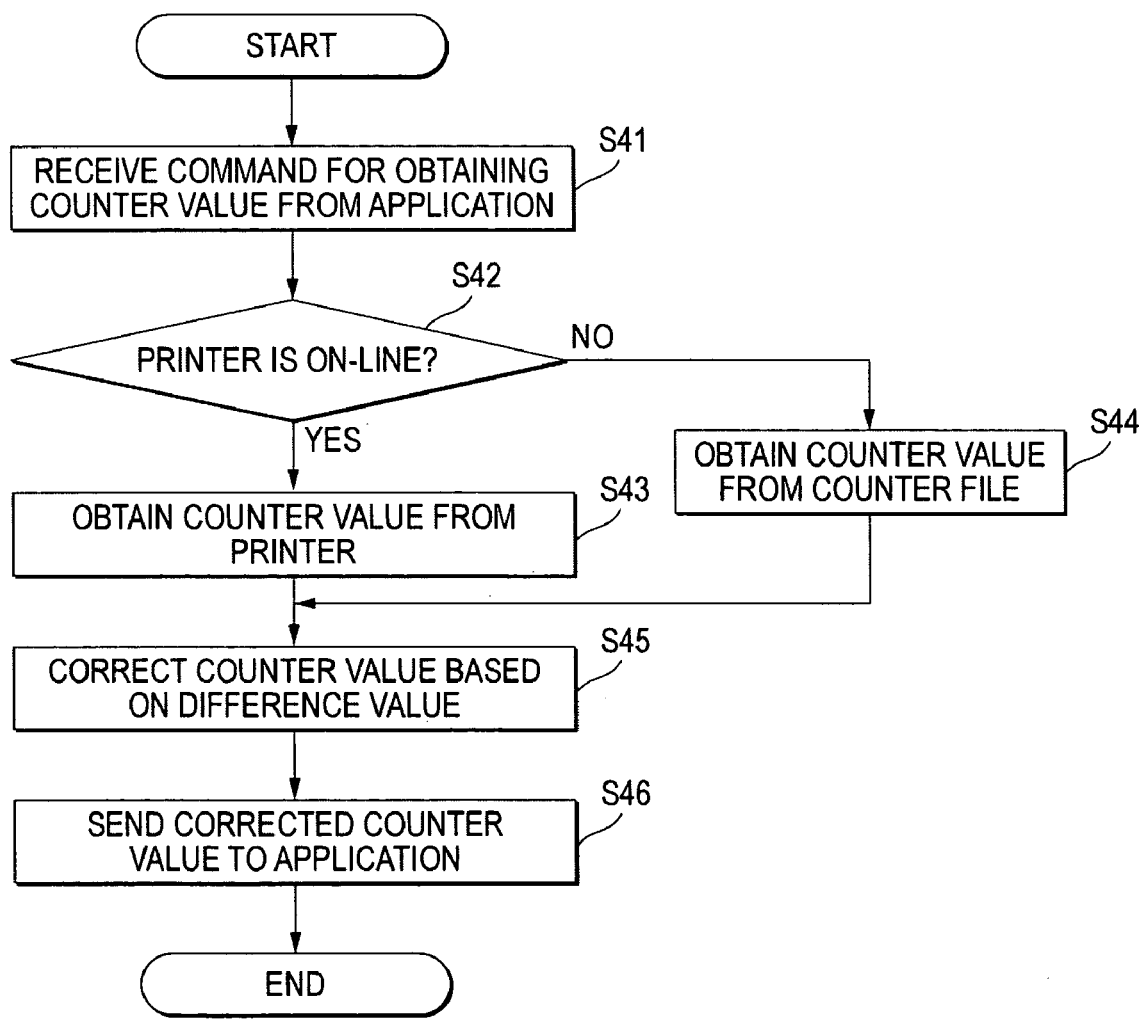
FIG. 5 is a flow chart of a counter reading process executed in the POS system of FIG. 1.

A process for updating or resetting counters in a printer having a maintenance counter 21 is shown in FIG. 4, and a process for reading the counters is shown in FIG. 5.

When an operation request such as a counter update command or a reset command is received from the application 11, the difference information is set according to the flow chart shown in FIG. 4.

More specifically, when the device manager 13 receives a reset command or an update command from the application 11, the values stored by the maintenance counter 21 of the printer 2 are read (S31, S32).

If a reset command is received, the device manager 13 writes the acquired count to the difference file 173. If an update command is received, the difference between the specified (update) setting and the current counter reading is determined as the difference information and stored to the difference file 173. Thus, if an update command is received, the difference between the current reading of the maintenance counter 21 and the reading to which the counter is to be updated is calculated, and the difference information in the difference file 173 is also updated accordingly (S33, S34).

For example, if the current reading acquired from the maintenance counter 21 is A, A is the difference information for the reset command. If the counter reads A and the value specified by the update command is B, the difference information for the update command is the difference (A-B).

As a result, instead of directly updating the maintenance counter 21 according to a reset command or an update command received from the application 11, a difference value used to manipulate the value stored by the maintenance counter 21 is calculated. As further described below, subsequent requests to read the counters are answered by calculating the apparent counter value at that time using this difference information. The same effect as when the maintenance counter 21 is updated directly can thus be achieved without directly updating the maintenance counter 21.

When reading the counter, the device manager 13 first receives a read counter command from the application 11 (S41) as shown in FIG. 5. These read counter commands can be executed as a batch command to get all counter readings or individual commands to get specific counter readings as described above, and the device manager 13 gets all or specific cumulative counts based on the commands from the application 11. The device manager 13 then determines if the printer 2 is on-line or not (S42).

If the printer 2 is on-line (YES in S42), the device manager 13 reads the maintenance counter 21 in the printer 2 (S43). If the printer 2 is off-line (NO in S42), the device manager 13 cannot access the maintenance counter 21 and thus acquires the counter values stored in the counter file 175 (S44). Note that the values stored in the counter file 175 are relatively recent.

The device manager 13 then acquires the difference information from the difference file 173 and uses this difference information to update the cumulative counts acquired as described above (S45). The updated counts are then returned to the application 11 (S46).

Instead of simply returning the values from the maintenance counter 21 to the application 11, the present invention thus returns the counts reflecting operations intended by the application 11.

Although the present invention has been shown and described with reference to specific preferred embodiments, various changes and modifications will be apparent to those skilled in the art from the teachings herein. Such changes and modifications as are obvious are deemed to come within the spirit, scope and contemplation of the invention as defined in the appended claims.

What is claimed is:

1. A POS (point-of-sale) terminal apparatus adapted to communicate with an external device, the POS terminal apparatus comprising:

an application for execution on the POS terminal apparatus;

a device manager operable to communicate with the external device, the device manager being configured to (i) determine whether the external device is capable of counting a first value indicating usage of a first function of the external device, and (ii) acquire the first value from the external device in response to a first command issued by the application in the case in which it is determined that the external device is capable of counting the first value; and a virtual counter operable to determine a second value indicating usage of a second function of the external device in response to a second command issued by the application, wherein, in response to a third command issued by the application, the application is notified of the first and second values, or a combined value thereof, in the case in which the first value is counted, and the application is notified of the second value in the case in which the first value is not counted;

the POS terminal apparatus further comprising:

an updater operable to update the second value in response to a fourth command issued by the application, the update being performed with reference to a third value obtained in response to the fourth command in the case in which the first value is not counted, and with reference to the first and third values in the case in which the first value is counted, wherein the first value, in the case in which it is counted, is retained even when the second value is updated.

2. The POS terminal apparatus as set forth in claim 1, further comprising a storage component, wherein the device manager is operable to store the first value in the storage component when a predetermined event occurs.

3. The POS terminal apparatus as set forth in claim 1, further comprising a storage component, wherein the device manager is operable to store the second value in the storage component when a predetermined event occurs.

4. The POS terminal apparatus as set forth in claim 1, wherein the virtual counter comprises a predictor operable to predict the second value in response to the second command.

5. The POS terminal apparatus as set forth in claim 4, further comprising a cumulative counter to store a cumulative count of the second value.

6. A method of managing usage of an external device in communication with a POS (point-of-sale) apparatus, the method comprising:
   running an application in the POS terminal apparatus;
   determining whether the external device is capable of counting a first value indicating usage of a first function of the external device;
   acquiring the first value from the external device in response to a first command issued by the application in a case in which it is determined that the external device is capable of counting the first value;
   determining a second value virtually indicating usage of a second function of the external device in response to a second command issued by the application;
   notifying the application, in response to a third command issued by the application, of the first and second values, or a combined value thereof, in the case in which the first value is counted, and of the second value in the case in which the first value is not counted; and
   updating the second value in response to a fourth command issued by the application, the update being performed with reference to a third value obtained in response to the fourth command in the case in which the first value is not counted, and with reference to the first and third values in the case in which the first value is counted,
   wherein the first value, in the case in which it is counted, is retained even when the second value is updated.

7. The method as set forth in claim 6, further comprising storing the first value when a predetermined event occurs.

8. The method as set forth in claim 6, further comprising storing the second value when a predetermined event occurs.

9. A POS (point-of-sale) terminal apparatus adapted to communicate with an external device, the POS terminal apparatus comprising:
   a general purpose computer including a processor and a memory, the general purpose computer configured to run an application;
   a device manager operable to communicate with the external device, the device manager being configured to (i) determine whether the external device is capable of counting a first value indicating usage of a first function of the external device, and (ii) acquire the first value from the external device in response to a first command issued by the application in the case in which it is determined that external device is capable of counting the first value;
   a virtual counter operable to determine a second value indicating usage of a second function of the external device in response to a second command issued by the application,
   wherein, in response to a third command issued by the application, the application is notified of the first and second values, or a combined value thereof, in the case in which the first value is counted, and of the second value in the case in which the first value is not counted;
   the POS terminal apparatus further comprising: an updater operable to update the second value in response to a fourth command issued by the application, the update being performed with reference to a third value obtained in response to the fourth command in the case in which the first value is not counted, and with reference to the first and third values in the case in which the first value is counted,
   wherein the first value, in the case in which it is counted, is retained even when the second value is updated.

* * * * *